United States Patent
Harris et al.

(10) Patent No.: US 8,131,942 B2
(45) Date of Patent: Mar. 6, 2012

(54) CONTROL DATA MODIFICATION WITHIN A CACHE MEMORY

(75) Inventors: Peter William Harris, Cambridge (GB); Donald Felton, Ely (GB)

(73) Assignee: ARM Limited, Cambridge (GB)

(*) Notice: Subject to any disclaimer, the term of this patent is extended or adjusted under 35 U.S.C. 154(b) by 989 days.

(21) Appl. No.: 12/081,530

(22) Filed: Apr. 17, 2008

(65) Prior Publication Data

US 2008/0294848 A1  Nov. 27, 2008

(30) Foreign Application Priority Data

May 22, 2007 (GB) .................................. 0709817.1

(51) Int. Cl.
  *G06F 12/00* (2006.01)
(52) U.S. Cl. ........................................................ 711/141
(58) Field of Classification Search ................... None
  See application file for complete search history.

(56) References Cited

U.S. PATENT DOCUMENTS

| 7,596,738 B2* | 9/2009 | Chessin et al. ............... 714/763 |
| 7,836,320 B2* | 11/2010 | Harris ........................ 713/324 |
| 2002/0065980 A1 | 5/2002 | Lasserre et al. |
| 2006/0112306 A1 | 5/2006 | Chessin et al. |
| 2006/0259828 A1 | 11/2006 | Swoboda |
| 2007/0260838 A1* | 11/2007 | Schwemmlein .............. 711/163 |

FOREIGN PATENT DOCUMENTS

| EP | 1 331 839 | 7/2003 |
| GB | 2 396 930 | 7/2004 |

OTHER PUBLICATIONS

European Search Report for GB0709817.1 dated Sep. 18, 2007.
English translation of Text of the First Office Action issued May 5, 2011 in CN Application 200810098584.5.

* cited by examiner

*Primary Examiner* — Brian Peugh
(74) *Attorney, Agent, or Firm* — Nixon & Vanderhye P.C.

(57) ABSTRACT

A data processing system is provided with at least one processor 4, 6, a main memory 18 and a cache memory 14. Cache data within the cache memory 14 has validity data V and control data associated therewith. The control data controls access to the cached data. Program instructions executed by the processors 4, 6 control a cache controller 26 to modify the control data associated with the cached data while it remains stored within the cache memory 14 and remains valid. The control data may, for example, specify a security flags indicating whether access is restricted to secure processes or processors.

32 Claims, 4 Drawing Sheets

CONTROL DATA MODIFICATION WITHIN A CACHE MEMORY

BACKGROUND OF THE INVENTION

1. Field of the Invention

This invention relates to the field of data processing systems. More particularly, this invention relates to the control of cache memories within data processing systems.

2. Description of the Prior Art

It is known to provide data processing systems with cache memories so as to increase the processing speed by making access to data and/or instructions faster. Whilst cache memories improve processing speed, they have the disadvantage of consuming power in that data has to be copied from main memory to the cache memory, from where it can be further manipulated, rather than being directly taken from the main memory. Furthermore, when the data is no longer required in the cache memory, then it must be written back to the main memory if it has been changed so as to maintain consistency. Cache loads and cache flushes in this way are also relatively slow. A particular problem arises in circumstances, such as context switches, when large amounts of data must be flushed from a cache memory and then new data loaded into the cache memory. This is disadvantageously slow and consumes a disadvantageous amount of power.

SUMMARY OF THE INVENTION

Viewed from one aspect the present invention provides apparatus for processing data comprising:

a memory;

at least one a processor coupled to said memory and responsive to program instructions to perform data processing operations; and a cache memory coupled to said memory and to said processor; wherein said cache memory has validity data and control data associated therewith, said validity data specifying if cached data is valid data and said control data specifying how access to cached data is controlled, and said cache memory is responsive to one or more program instructions executed by one of said at least one processors to modify said control data.

The present techniques recognise that in at least some circumstances it is possible to avoid cache flushing and cache reloading operations, i.e. maintaining the cache data as valid, by modifying control data associated with that cached data within the cache memory rather than flushing the data and then reloading the data with its new control data. As an example, if a large block of data values is being processed by a particular program thread and the cache memory includes control data which permits access by that particular program thread but not other program threads and it is desired to provide access to that data to another program thread, then the standard technique would be to flush the data from the cache and then reload that data with the new control data appropriate to provide access to the new program thread. However, the present technique recognises that program instructions executed by the processor may be used to directly modify the control data within the cache memory so as to permit access by the new program thread and thereby avoid flushing and reloading with its associated speed and power consumption penalties.

It will be appreciated that the control data could take a wide variety of different forms. As examples, it would be possible for the control data to be TAG data specific to a particular virtual to physical address mapping, or thread identifying data, such as an ASID.

Another example of control data which may be modified arises in a system in which the processors have a plurality of access states (e.g. security modes) associated therewith and only certain of these states permit access to controlled regions of memory. The control data within the cache memory can specify the access states which must be current for a processor in order for it to be able to access the cache data concerned. In this context, it may be desired to restrict access to a given access state of a processor for one period of time and then to open up the access to a different access state, possibly with a different processor, at a later time. The present technique permits program instructions executing on at least one of the processors to modify the access control data to permit such changes at the level of the cache memory without requiring cache flushing and cache reloading. Such an arrangement may, for example, be conveniently used within a system having multiple processors with the access data specifying the identity (e.g. number) of the processor or processors permitted to access particular portions of the cache data. This control data can be dynamically modified without having to flush and reload the cache data, i.e. maintaining the validity of the data over such a modification.

The present technique is particularly useful when at least one of the processors has a secure state and a non-secure state with the control data being used to restrict access to cache data cached from secure regions of memory to only processors operating in the secure state. In accordance with the present technique, a processor executing in the secure state may be permitted to execute program instructions changing the control data specifying that only processors in the secure state may access certain cache data thereby opening up access to that data to processors executing in a non-secure state. This type of behaviour is particularly useful in fields such as digital rights management where large volumes of data may need to be manipulated both in a secure state and a non-secure state with the present technique providing a way of reducing the amount of cache flushing and cache reloading which might otherwise be required.

It will be appreciated that the change in the security flag which is part of the control data may be from indicating that certain data is secure data to indicating that the data is non-secure data, or alternatively changing the security flag from indicating that certain data is non-secure data to indicating that it is secure data.

The present technique may be used with good advantage within systems employing memory protection units which are programmable by at least one of the processors so as to specify which regions of the memory are secure and which regions are non-secure. The processor in such a system is already devolved control over security and accordingly can be trusted to make appropriate modifications to the control data within the cache memory in accordance with the present technique.

It will be appreciated by those in this technical field that there is often provided a hierarchy of cache memories within a data processing system. This is particularly the case within systems including more than one processors. It is common for a processor to have a small level-1 cache memory and access to a larger level-2 cache memory. Whilst the present technique can be employed in relation to either or both of these memories, the control complexity associated with applying the technique for multiple levels of cache memory within a cache memory hierarchy is high, e.g. to avoid race conditions between modifications to control data being performed for coherency at the various levels within the hierarchy. Accordingly, it is practical to restrict use of the present technique to one level within the cache hierarchy. In this context, a larger benefit is achieved by applying the present technique at the level-2 cache memory since this is typically larger and accordingly avoiding the need to flush and reload larger volumes of data associated with the level-2 cache memory is more advantageous compared to the smaller volumes of data typically associated with level-1 cache memories.

The program instructions which perform the changes to the control data within the cache memories can take a variety of different forms. Specific cache lines could be targeted. However, it is convenient to provide program instructions which specify a range of memory addresses for which the control data is to be changed for any data cached within the cache memory falling within that range. Access control is often managed within MMUs and MPUs on a region-by-region basis and it is convenient to instruct changes within the control data stored within the cache memories on a similar region-by-region basis, as may be specified by the range values within such program instructions.

It may also be advantageous to avoid potential aliasing problems within the cache memory when a change in control data is made by adapting the cache memory to respond to program instructions for changing the control data to additionally identify cache lines which will alias with the new cache data with its modified control data and flush those aliasing cache lines from the cache memory.

The secure and non-secure states previously discussed may be part of a security environment in which the processor operates in a secure domain or a non-secure domain with changes between the domains taking place via a monitor mode, and each of the domains including a respective plurality of modes of operation.

Viewed from another aspect the present invention provides a method for processing data within a data processing apparatus having a memory, at least one a processor coupled to said memory and responsive to program instructions to perform data processing operations, and a cache memory coupled to said memory and to said processor, said method comprising the steps of:

using validity data associated with said cache memory to specify if cached data is valid;

using control data to specify how access to cached data is controlled; and in response to one or more program instructions executed by one of said at least one processors to modify said control data.

Viewed from a further aspect the present invention provides apparatus for processing data comprising:

memory means;

at least one processor means coupled to said memory means for performing data processing operations in response to program instructions; and cache memory means coupled to said memory means and to said processor means; wherein said cache memory means has validity data and control data associated therewith, said validity data specifying if cached data is valid data and said control data specifying how access to cached data is controlled, and said cache memory means is responsive to one or more program instructions executed by one of said at least one processor means to modify said control data.

A complementary aspect of the present invention is a computer program product storing a computer program for controlling an apparatus for processing data in accordance with the above and including one or more program instructions for setting the control data in accordance with the above discussed techniques.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
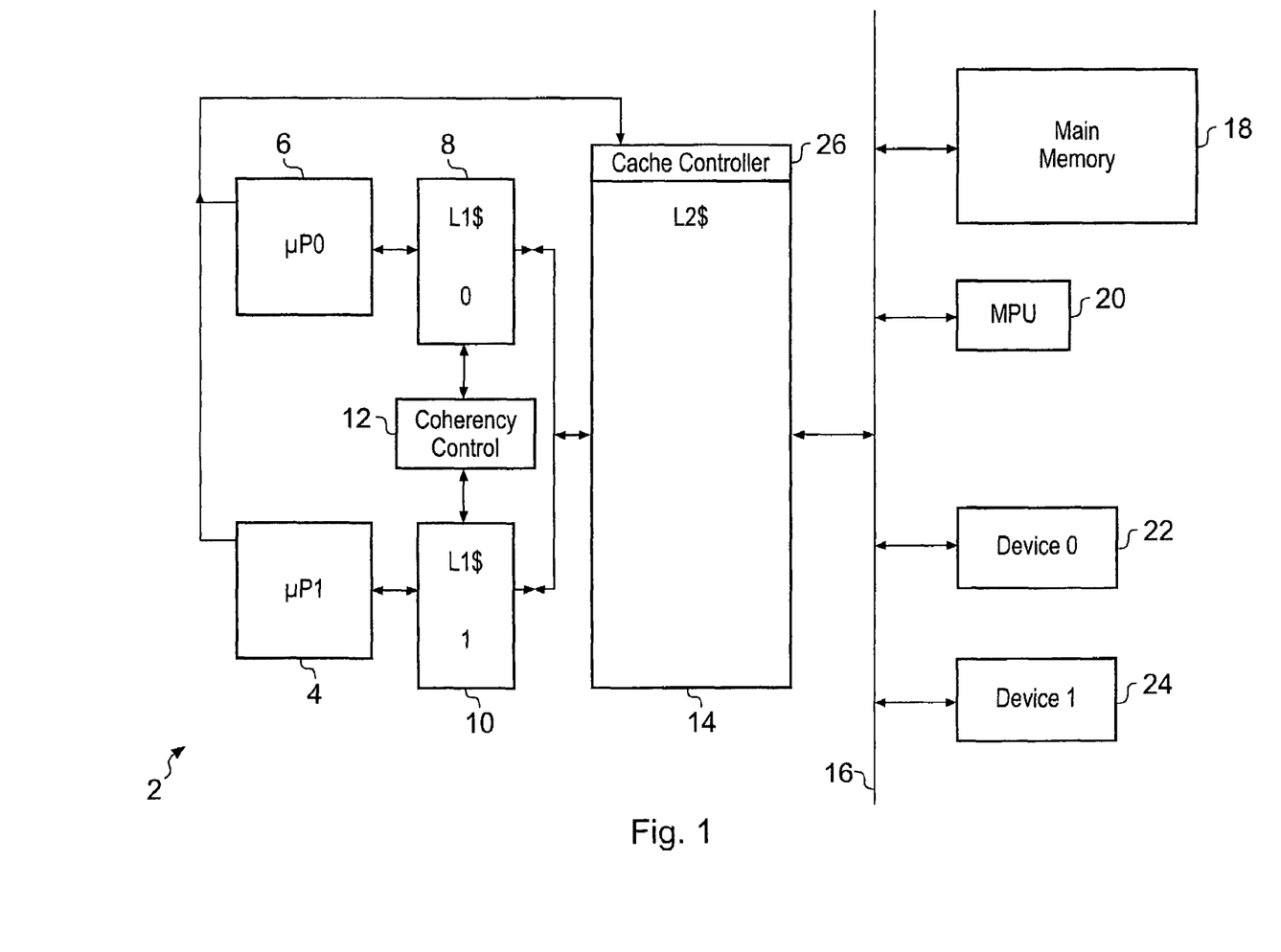
FIG. 1 schematically illustrates a data processing apparatus including multiple processors, a cache memory hierarchy and multiple devices sharing access to a main memory with the multiple processors.

FIG. 1 schematically illustrates a data processing system 2 including multiple processors 4, 6 each having a level-1 cache memory 8, 10. Coherency control circuitry 12 is responsible for maintaining coherency between the two level-1 cache memories 8, 10 and accordingly, if a change is made to the control data associated with the cache line in one of the level-1 cache memories 8, 10, then the coherency control circuitry 12 identifies this change and then makes the corresponding change within the other of the level-1 cache memories 8, 10.

A relatively large level-2 cache memory 14 is shared between the processors 4, 6 and is coupled to a main system bus 16. Also coupled to the main system bus are a main memory 18, which includes different regions having different access permissions associated therewith (e.g. secure regions, non-secure regions etc). A memory protection unit 20 is responsible for policing access to the main memory 18 by either of the processors 4, 6 or either of two further devices 22, 24 which are also coupled to the main bus 16.

Figure 2:
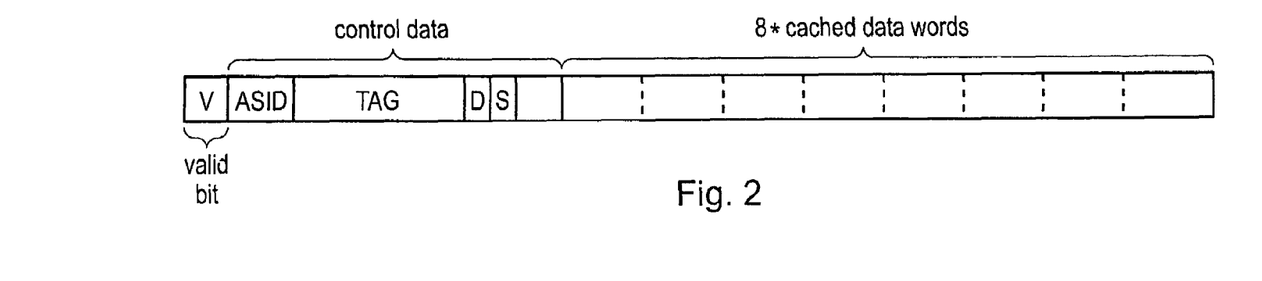
FIG. 2 schematically illustrates the data associated with a cache line within a cache memory including control data and validity data.

FIG. 2 schematically illustrates a line of cache data within the level-2 cache memory 14. This comprises eight cache data words having control data and validity data associated therewith. The validity data comprises a valid bit V. The control data can take a variety of different forms and can include a thread identifying ASID, a tag data field TAG (e.g. specifying a virtual or physical address corresponding to the cached data), a dirty bit D specifying whether or not the data within the cache line has been subject to any modifications since it was loaded and a security specifying bit S specifying whether or not the data within that cache line is restricted so that it can only be accessed by devices operating within the secure domain, whether those be one of the processors 4, 6 or one of the devices 22, 24 with appropriate permissions or operating in an appropriate mode.

Figure 3:
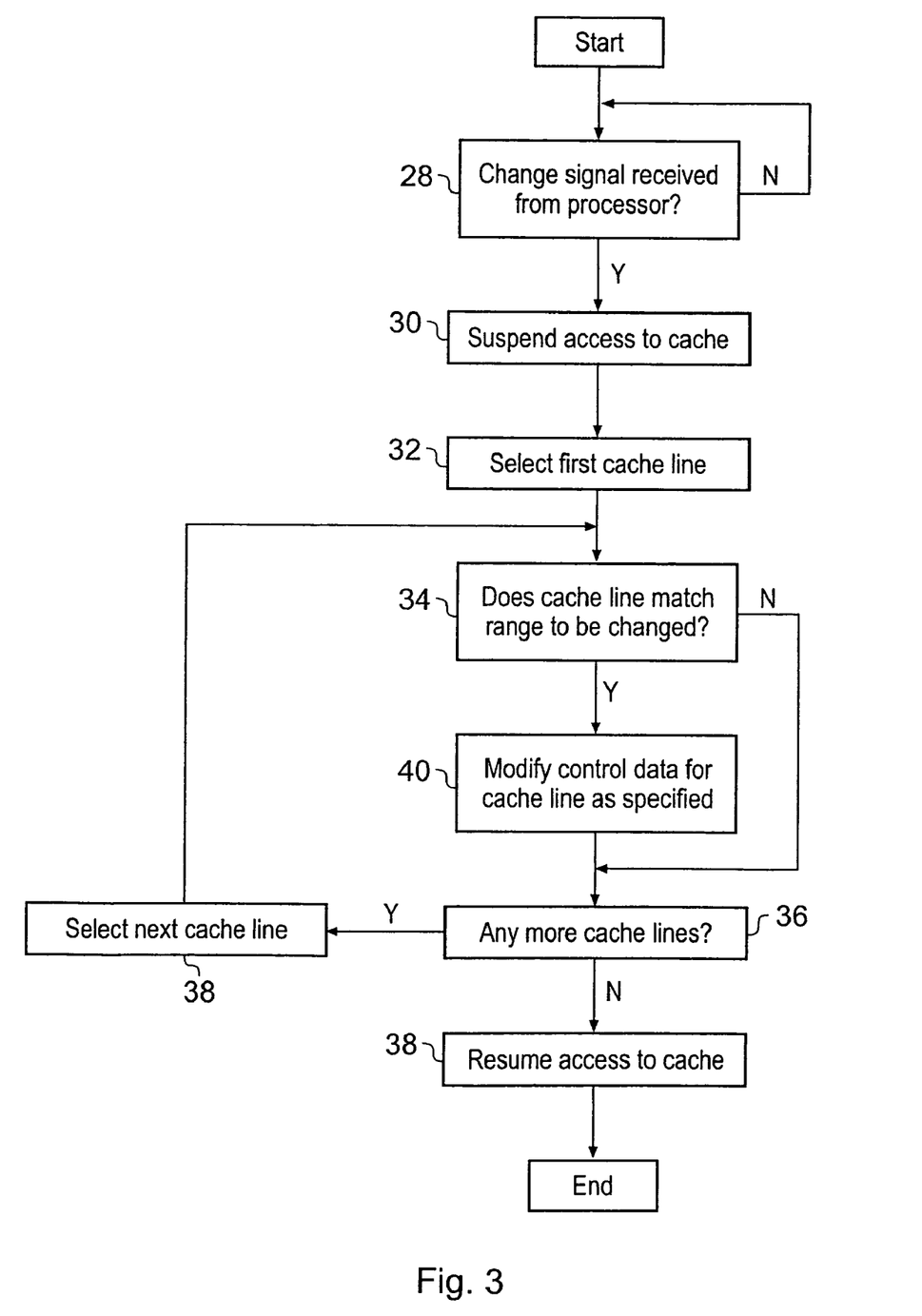
FIG. 3 is a flow diagram schematically illustrating the processing which is performed by a cache controller upon execution of a program instruction specifying a change in control data to be performed upon a range of cache data values.

FIG. 3 is a flow diagram schematically illustrating the processing which is performed by a cache controller 26 associated with the level-2 cache memory 14 upon execution of program instructions by either of the processors 4, 6 specifying a change to be made in control data stored within the level-2 cache memory 14. The program instructions may be coprocessor instructions, or other forms of instruction typically used to control cache controllers. The program instructions specify either individual memory addresses, or more likely ranges of memory addresses, to which the altered control data is to be applied. The program instructions will also specify the change in control data to be made, e.g. a new setting of a security flag, a new ASID, a new TAG entry etc.

At step 28 the cache controller 26 waits until a signal is received from one of the processors 4, 6 indicating that a program instruction of the above type has been executed. When such a signal is received, then at step 30 access to the level-2 cache memory 14 is suspended whilst the change in control data is performed. Step 32 then selects the first cache line within the level-2 cache memory 14. Step 34 determines whether or not the cache line selected matches the range of addresses for which the change in control parameter has been commanded. This matching may, for example, be performed in dependence upon the TAG data field illustrated in FIG. 2 which specifies the memory addresses associated with the cache data line. If a match is not found, then processing proceeds to step 36 where a determination is made as to whether or not there are any more cache lines for which a potential match needs to be identified. If there are such further cache lines, then step 38 selects the next cache line and processing returns to step 34. If there are no further cache lines, then processing proceeds to step 38 where access to the cache is resumed.

If the determination at step 34 was that the cache line selected does match the range of addresses for which a change in control data has been specified, then processing proceeds to step 40 where the modified control data is written into the cache line in accordance with the program instruction which has been executed. The modified control data could be a new security flag to be set for that cache line, e.g. changing the cache line from access to secure mode only processes to access by non-security mode processors. Another example of the change is a reprogramming of the TAG value itself upon which a match has been made or a reprogramming of a thread identifying field (ASID).

A problem which can arise during modification of the control data as described above is that it can introduce aliasing with existing cache data. As an example, it may be that if the TAG data is modified, then the modified data could match an existing TAG data field within a different cache line and accordingly an aliasing problem would arise in which the cache memory would appear to contain two copies (which would likely be different) of the data from the same memory addresses within the main memory 18. In order to avoid this situation, the cache controller 26 can additionally perform the steps of identifying any cache lines which will alias with the newly modified cache lines with their new control data and then flushing such existing cache lines which are found to alias with the new cache lines. Thus, the level-2 cache memory 14 will only contain one copy of a given cache line.

Figure 4:
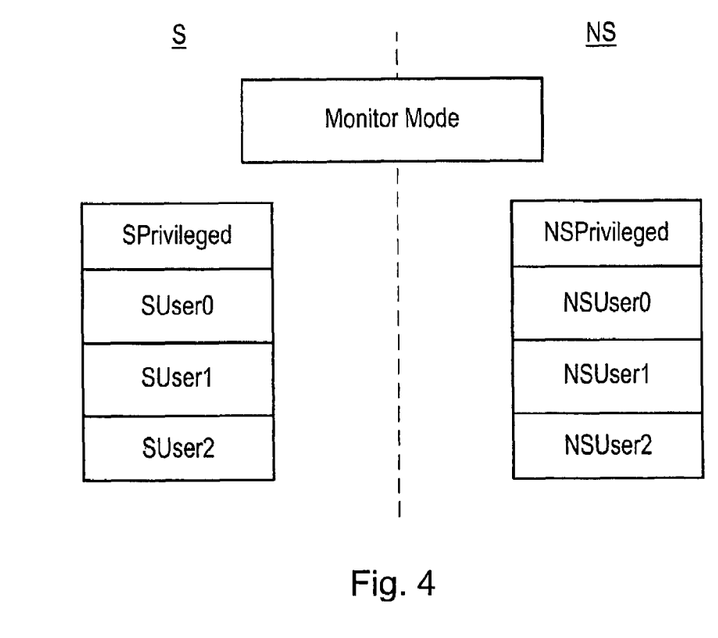
FIG. 4 schematically illustrates the operating modes of a system including a secure domain and a non-secure domain and FIG. 5 illustrates one example use of the present technique for changing the security flag associated with cache data when changing between a non-secure domain and a secure domain so as to avoid cache flushing and reloading.

FIG. 4 schematically illustrates the security domains and processing modes which can be adopted by a processor 4, 6 in accordance with the present techniques. These security domains and processing modes are similar to the TrustZone architecture provided by processors of ARM Limited, Cambridge, England. This security architecture includes a secure domain S and a non-secure domain NS. Changes between the secure domain S and the non-secure domain NS must be made via a monitor mode. Changes between the domains are not permitted other than via the monitor mode. Within each of the domains there are provided a plurality of different modes of operation including a privileged mode and several user modes.

This type of security architecture is useful in giving security to sensitive data, such as cryptographic keys and the like. Regions of memory in accordance with this type of architecture can be specified being accessible when operating within the secure domain and being non-accessible when operating in the non-secure domain. Thus, data such as cryptographic keys can be kept secure since only trusted software operating in the secure domain is able to access such data.

Figure 5:
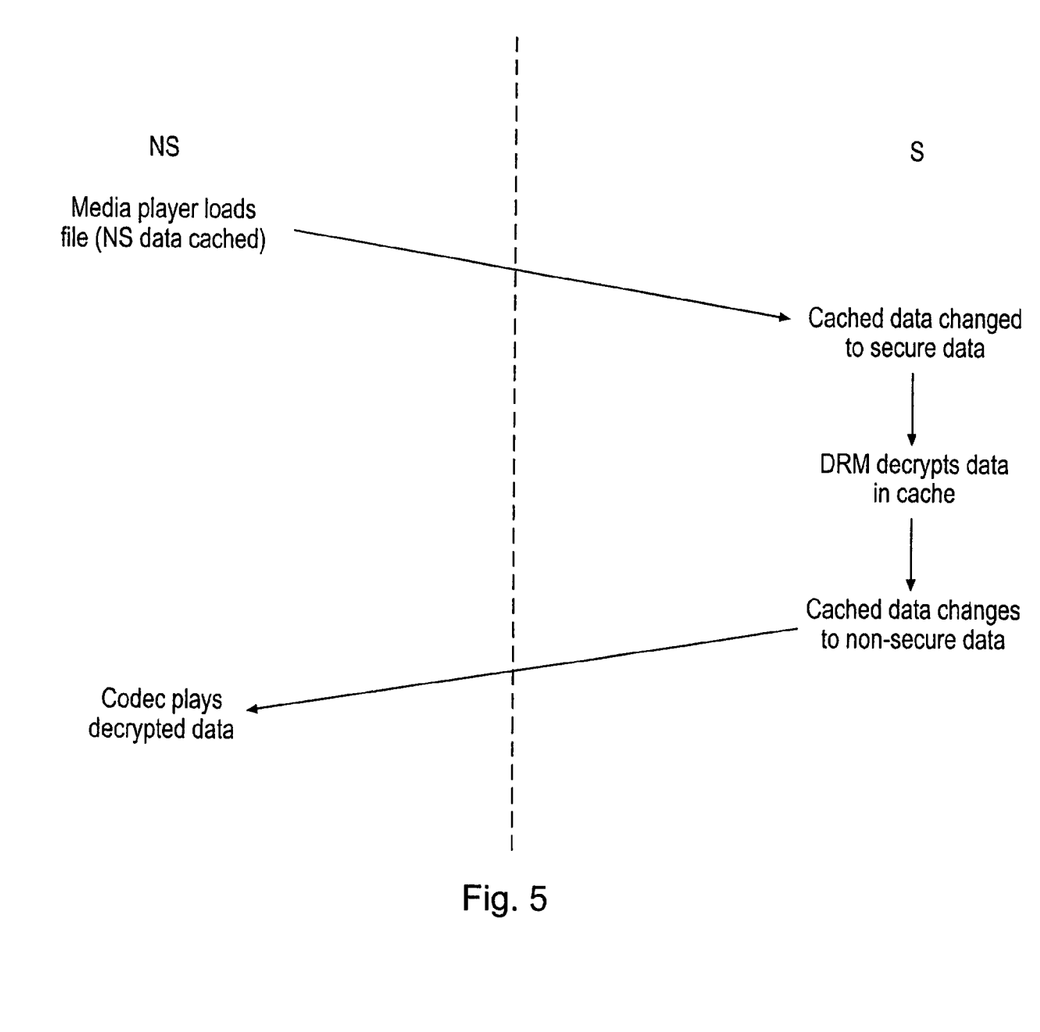

FIG. 5 is a diagram schematically illustrating one example use of the present techniques. The processing starts with a media player loading a file which is encrypted. This media player is not a trusted piece of software and executes in the non-secure domain. The file when it is loaded will be cached within the level-2 cache memory 14 for more rapid processing. As the data has been loaded by the media player in the non-secure domain it is specified as non-secure data. The encrypted data can be accessible in the non-secure domain as it is protected by its encryption. Processing proceeds to switch to the secure domain, via the monitor mode. One or more program instructions are then executed by one of the processors, 4, 6 specifying that the cache controller 26 should change the security flag associated with the cache data for the media file which is cached within the level 2 cache 14. Thus, the cached data can be changed from being marked as non-secure data to being marked as secure data. This protects the data during its decryption process as otherwise potentially sensitive information concerning the decryption, such as information indicative of the security keys being used, may leak from the system. When the cache data has had its control data changed in this way, then digital rights management software operating in a secure domain decrypts the cached data. Following this decryption further program instructions are executed to trigger the cache controller 26 to change the security flag associated with the cached data back to indicating that the cached data is non-secure data. At this point the cached data can have been decrypted and the secure processes can have ensured that any sensitive partially processed data, or associated data values, which might give an indication of sensitive cryptographic keys and the like, have been removed from the cached data. Thus, when the cached data is changed back to non-secure data, control can be passed to a codec which can play the decrypted data from within the level-2 cache memory 14.

This technique is for a new cache maintenance operation which can be issued by a secure processing task to switch the state of the NS bit in the cache line tag for a particular address region (virtual or physical, depending on the cache implementation).

Operation One: Switching NS to S by Range

In this case the secure software is converting a buffer from non-secure to secure. The operation first searches the range and checks that there are no existing S-tagged cache lines that would conflict with the NS lines in the range if they were converted. If there are conflicts, then the existing secure lines get invalidated (the secure world software should ensure this never happens as it would indicate a software bug if it occurred), and then the NS lines in the range are switched to S.

Operation Two: Switching S to NS by Range

In this case the secure software is converting a buffer from secure to non-secure. The operation first searches the range and check that there are no existing NS-tagged cache lines that would conflict with the S lines if they were converted. If there are conflicts, then the existing non-secure lines get invalidated (the normal world software should ensure this never happens as it would indicate a software bug if it occurred), and then the S lines in the range are switched to NS.

The main use of this technique is for D-side accesses, but I-side operation would also be possible.

When using the present technique, measure should be taken to sync L1 and L2 caches, especially if the L2 is shared across multiple masters. Such mechanisms are well understood in this technical field and are not discussed further herein.

For a single tier cache system the following sequence is one example use.

Memory buffer filled by NS processing task.
    Control of memory passed to S processing task
        After this point the NS process should not use the buffer, or it risks data corruption or data aborts.
    S processing task issues Operation One (Switch NS to S By Range).
    S processing task switches physical memory to secure using the MPU.
        Cache line evictions between the above two bullets should still work, as S access to NS memory should be allowed if you treat NS bit as security permissions bit, not an address bit.
        Any Normal World writes to the memory region between the two above bullets risk getting lost (data corruption), but that is violating the software rules defined in the control passing mechanism. There is no security violation here, as the data came from the Normal World anyway.
    S processing task makes use of data, including storing confidential values in this region.
    S processing task clears any confidential data in the region.
    S processing task sets the physical memory to NS using the MPU.
    S processing task issues Operation Two (Switch S to NS By Range).
        Cache line evictions between the above two bullets should still work, as S access to NS memory should be allowed if you treat NS bit as security permissions bit, not an address bit.
        Any Normal World writes to the memory region between the two above bullets risk getting lost (data corruption), but that is violating the software rules defined in the control passing mechanism. There is no security violation here, as the data is being returned to the Normal World anyway.
    S processing task passes control to the NS processing task.

For a multi-tier cache system a simple and cost effective use of these new operations is to "integrate in L2 only" and force the secure software to clean and invalidate L1 before changing the secure processing state. Because L2 is typically much larger than L1, this seems to be where most of the benefit will be gained.

More complex designs using these new operations in L1 and L2 can be achieved, but the following sequences indicate the problems for the software implementer.

Control of buffer passes to S processing task.
    switch state of L1 from NS to S
        Line eviction from L1 at this point will no longer hit the correct (still NS) line in L2 resulting in data corruption.
        The evicted data may hit a different 'S' cache line in L2—but this is violating the memory control sharing rules described above, and should be considered programmer error.
    Control of buffer passes to S processing task.
    Switch state of L2 from NS to S.
        Line eviction from L1 (still NS) at this point will no longer hit the correct (now S) line in L2 resulting in data corruption.
        The evicted data may hit a different 'NS' cache line in L2—but this is violating the memory control sharing rules described above, and should be considered programmer error.

A way to achieve this L1 and L2 use is to implement a hardware assist translation layer (like another MPU) between L1 and L2, or temporarily disable L1 caches while performing this operation to ensure they cannot get out of sync.

It will be seen from the above that once the media player has loaded the encrypted file into the cache memory 14, then the data can be maintained within the cache memory 14 and manipulated therein without needing to be flushed and reloaded as part of changing the secure status thereof. This saves power and increases speed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:

a memory;

at least one processor coupled to said memory and responsive to program instructions to perform data processing operations; and a cache memory coupled to said memory and to said processor; wherein said cache memory has validity data and control data associated therewith, said validity data specifying if cached data is valid data and said control data specifying how access to cached data is controlled, and said cache memory is responsive to one or more program instructions executed by one of said at least one processors to modify said control data, wherein said at least one processor has one of a plurality of access states associated therewith;

said memory has at least one controlled region accessible to one of said at least one processor having an authorised access state and non-accessible to one of said at least one of said processor not having said authorised access state;

said control data including an access field marking cached data as either controlled data cached from a controlled region of said memory or not controlled data not cached from a controlled region of said memory, cached data marked as controlled data within said cache memory accessible to one of said at least one processor having said authorised access state and being non-accessible to one of said at least one processor not having said authorised access state, wherein said at least one processor comprises a processor having a secure state and a non-secure state, said memory having at least one secure region accessible to said processor when operating in said secure state and non-accessible to said processor when operating in said non-secure state; and said access field is a security flag marking cached data as either secure data cached from a secure region of said memory or non-secure data cached from a non-secure region of said memory, cached data marked as secure data within said cache memory being accessible to said processor when operating in said secure state and non-accessible to said processor when operating in said non-secure state; wherein said cache memory, in response to program instructions executed by said processor, setting said security flag associated with cached data cached within said cache memory without flushing and reloading the cached data, said processor being unable to set said security flag when operating in said non-secure state.

2. Apparatus as claimed in claim 1, wherein said control data comprises one or more of:
TAG data; and
program thread specifying data.

3. Apparatus as claimed in claim 1, wherein said processor when operating in said secure state is responsive to one or more program instructions to change said security flag associated with data cached within said cache memory from marking said data as non-secure data to marking said data a secure data.

4. Apparatus as claimed in claim 1, wherein said processor when operating in said secure state is responsive to one or more program instructions to change said security flag associated with data cached within said cache memory from marking said data as secure data to marking said data as non-secure data.

5. Apparatus as claimed in claim 1, comprising a memory protection unit coupled to said memory and programmable by said processor to control which regions of said memory are accessed as secure regions and which regions of said memory are non-secure regions.

6. Apparatus as claimed in claim 5, comprising one or more further devices, including at least one non-secure device, coupled to said memory by a bus, said memory protection unit being coupled to said bus and being adapted to prevent access to a secure region of said memory by said at least one non-secure device.

7. Apparatus as claimed in claim 1, comprising a further cache memory coupled between said processor and said cache memory.

8. Apparatus as claimed in claim 7, wherein said further cache memory is a level-one cache memory and said cache memory is a level-two cache memory.

9. Apparatus as claimed in claim 8, comprising a plurality of processor coupled to said level-two cache memory.

10. Apparatus as claimed in claim 1, wherein said cache memory is a physically tagged cache memory.

11. Apparatus as claimed in claim 1, wherein said one or more program instructions specify a range of memory address for which said control data is to be changed for any data cached in said cache memory from within said range.

12. Apparatus as claimed in claim 1, wherein said cache memory is one of a plurality of coherent cache memories and further comprising coherency circuitry responsive to a change in said control data within one of said plurality of coherent cache memories to make corresponding changes in all of said plurality of coherent cache memories.

13. Apparatus as claimed in claim 1, wherein said cache memory when changing said control data associated with cached data within said cache memory also flushes any existing cached data within said cache memory that aliases with said cached data for which said control data is being changed.

14. Apparatus as claimed in claim 1, wherein said secure state is a secure domain having a plurality of secure operating modes for said processor and said non-secure state is a non-secure domain having a plurality of non-secure operating modes for said processor.

15. Apparatus as claimed in claim 14, wherein any change between said secure domain and said non-secure domain is via a monitor mode of operation.

16. A computer program product including a non-transitory computer readable storage medium for storing a computer program for controlling apparatus for processing data as claimed in claim 1, said computer program including one or more program instructions for setting said control data.

17. A method for processing data within a data processing apparatus having a memory, at least one processor coupled to said memory and responsive to program instructions to perform data processing operations, and a cache memory coupled to said memory and to said processor, said method comprising the steps of:
using validity data associated with said cache memory to specify if cached data is valid;
using control data to specify how access to cached data is controlled; and
in response to one or more program instructions executed by one of said at least one processors to modify said control data, wherein said at least one processor has one of a plurality of access states associated therewith;
said memory has at least one controlled region accessible to one of said at least one processor having an authorised access state and non-accessible to one of said at least one processor not having said authorised access state;
said control data including an access field marking cached data as either controlled data cached from a controlled region of said memory or not controlled data not cached from a controlled region of said memory, cached data marked as controlled data within said cache memory accessible to one of said at least one processor having said authorised access state and being non-accessible to one of said at least one processor not having said authorised access state, wherein
said at least one processor comprises a processor having a secure state and a non-secure state, said memory having at least one secure region accessible to said processor when operating in said secure state and non-accessible to said processor when operating in said non-secure state; and
said access field is a security flag marking cached data as either secure data cached from a secure region of said memory or non-secure data cached from a non-secure region of said memory, cached data marked as secure data within said cache memory being accessible to said processor when operating in said secure state and non-accessible to said processor when operating in said non-secure state; wherein
said cache memory, in response to program instructions executed by said processor, setting said security flag associated with cached data cached within said cache memory without flushing and reloading said cached data, said processor being unable to set said security flag when operating in said non-secure state.

18. A method as claimed in claim 17, wherein said control data comprises one or more of:
TAG data; and
program thread specifying data.

19. A method as claimed in claim 17, wherein said processor when operating in said secure state is responsive to one or more program instructions to change said security flag associated with data cached within said cache memory from marking said data as non-secure data to marking said data as secure data.

20. A method as claimed in claim 17, wherein said processor when operating in said secure state is responsive to one or more program instructions to change said security flag associated with data cached within said cache memory from marking said data as secure data to marking said data as non-secure data.

21. A method as claimed in claim 17, wherein said data processing apparatus has a memory protection unit coupled to said memory and programmable by said processor to control which regions of said memory are accessed as secure regions and which regions of said memory are non-secure regions.

22. A method as claimed in claim 21, wherein said data processing apparatus has one or more further devices, including at least one non-secure device, coupled to said memory by a bus, said memory protection unit being coupled to said bus and being adapted to prevent access to a secure region of said memory by said at least one non-secure device.

23. A method as claimed in claim 17, wherein said data processing apparatus has a further cache memory coupled between said processor and said cache memory.

24. A method as claimed in claim 23, wherein said further cache memory is a level-one cache memory and said cache memory is a level-two cache memory.

25. A method as claimed in claim 24, wherein said data processing apparatus has a plurality of processor coupled to said level-two cache memory.

26. A method as claimed in claim 17, wherein said cache memory is a physically tagged cache memory.

27. A method as claimed in claim 17, wherein said one or more program instructions specify a range of memory address for which said control data is to be changed for any data cached in said cache memory from within said range.

28. A method as claimed in claim 17, wherein said cache memory is one of a plurality of coherent cache memories and said data processing apparatus has coherency circuitry responsive to a change in said control data within one of said plurality of coherent cache memories to make corresponding changes in all of said plurality of coherent cache memories.

29. A method as claimed in claim 17, wherein said cache memory when changing said control data associated with cached data within said cache memory also flushes any existing cached data within said cache memory that aliases with said cached data for which said control data is being changed.

30. A method as claimed in claim 17, wherein said secure state is a secure domain having a plurality of secure operating modes for said processor and said non-secure state is a non-secure domain having a plurality of non-secure operating modes for said processor.

31. A method as claimed in claim 30, wherein any change between said secure domain and said non-secure domain is via a monitor mode of operation.

32. Apparatus for processing data comprising:
memory means for storing data;
at least one processor means, coupled to said memory means, for performing data processing operations in response to program instructions; and
cache memory means, coupled to said memory means and to said at least one processor means, for storing cached data; wherein
said cache memory means has validity data and control data associated therewith, said validity data specifying if cached data is valid data and said control data specifying how access to cached data is controlled, and said cache memory means is responsive to one or more program instructions executed by one of said at least one processor means to modify said control data, wherein
said at least one processor means has one of a plurality of access states associated therewith;
said memory means has at least one controlled region accessible to said at least one processor means having an authorised access state and non-accessible to said at least one processor means not having said authorised access state;
said control data including an access field marking cached data as either controlled data cached from a controlled region of said memory means or not controlled data not cached from a controlled region of said memory means, cached data marked as controlled data within said cache memory means and accessible to one of said at least one processor means having said authorised access state and being non-accessible to one of said at least one processor means not having said authorised access state, wherein
said at least one processor means comprises a processor means having a secure state and a non-secure state, said memory having at least one secure region accessible to said processor means when operating in said secure state and non-accessible to said processor means when operating in said non-secure state; and
said access field is a security flag marking cached data as either secure data cached from a secure region of said memory means or non-secure data cached from a non-secure region of said memory means, cached data marked as secure data within said cache memory means being accessible to said processor means when operating in said secure state and non-accessible to said processor means when operating in said non-secure state; wherein said cache memory, in response to program instructions executed by said processor means, setting said security flag associated with cached data cached within said cache memory without flushing and reloading the cached data, said processor means being unable to set said security flag when operating in said non-secure state.

* * * * *